United States Patent
Wu et al.

(10) Patent No.: US 10,069,652 B1
(45) Date of Patent: Sep. 4, 2018

(54) REDUCED-OVERHEAD CHANNEL ESTIMATION METHOD AND SYSTEM THEREOF FOR MASSIVE MIMO SYSTEMS

(71) Applicant: Chunghwa Telecom Co., Ltd., Yangmei, Taoyuan (TW)

(72) Inventors: Jwo-Yuh Wu, Yangmei (TW); Ta-Sung Lee, Yangmei (TW); Chih-Chun Tseng, Yangmei (TW); Wen-Hsuan Li, Yangmei (TW); Ssu-Han Lu, Yangmei (TW)

(73) Assignee: Chunghwa Telecom Co., Ltd., Taoyuan (TW)

( * ) Notice: Subject to any disclaimer, the term of this patent is extended or adjusted under 35 U.S.C. 154(b) by 0 days.

(21) Appl. No.: 15/441,806

(22) Filed: Feb. 24, 2017

(51) Int. Cl.
*H04L 25/02* (2006.01)
*H04B 7/0413* (2017.01)
*H04B 7/06* (2006.01)

(52) U.S. Cl.
CPC ....... *H04L 25/0242* (2013.01); *H04B 7/0413* (2013.01); *H04B 7/0626* (2013.01)

(58) Field of Classification Search
CPC .. H04B 7/0626; H04B 7/0417; H04B 7/0452; H04B 7/0632; H04B 7/0413; H04B 7/0619; H04L 25/0224; H04L 25/0242; H04W 88/08
See application file for complete search history.

(56) References Cited

U.S. PATENT DOCUMENTS

2016/0226564 A1* 8/2016 Taherzadeh Boroujeni ............... H04B 7/0417
2017/0279508 A1* 9/2017 Truong ............... H04B 7/0626

OTHER PUBLICATIONS

Chih-Chun Tseng et al., Enhanced Compressive Downlink CSI Recovery for FDD Massive MIMO Systems Using Weighted Block $\ell_1$-Minimization, IEEE Transactions on Communications, Mar. 2016, pp. 1055-1067, vol. 64, No. 3.

* cited by examiner

*Primary Examiner* — Vineeta Panwalkar
(74) *Attorney, Agent, or Firm* — JCIPRNET

(57) ABSTRACT

A reduced-overhead channel estimation method and system thereof for massive MIMO systems is provided in present application. The method is applied in a base station device, and includes following steps: first, enabling the base station device to acquire a plurality of channel matrixes between the base station device and one or a plurality of external user devices, then enabling the base station device to label the positions of a non-zero coefficient and a common support coefficient in a plurality of fields of the channel matrixes, and then enabling the base station device to configure the non-zero coefficient and the common support coefficient to have the weights different from the weights of the coefficients in the other fields in the channel matrixes so as to provide estimating channel matrixes.

10 Claims, 7 Drawing Sheets

US 10,069,652 B1

REDUCED-OVERHEAD CHANNEL ESTIMATION METHOD AND SYSTEM THEREOF FOR MASSIVE MIMO SYSTEMS

BACKGROUND OF THE INVENTION

1. Field of the Invention

The present invention generally relates to a reduced-overhead channel estimation method and the system thereof, in particular to a reduced-overhead channel estimation method and the system thereof for massive MIMO systems.

2. Description of the Prior Art

Currently, the implementation of channel feedback under most MIMO systems depends on the precoding of the codebook in order to reduce the load of the feedback. However, for the massive MIMO systems, the size of the codebook will significantly increase due to large numbers of antennas in the systems; on the other hand, the quantified channel status information must be influenced by the error of the quantification, so its precision will be low.

Besides, if user devices need to obtain the status information of downlink channels, the base station device should transmit pilot signals with long length; further, the user devices should perform highly complicated channel estimation, which will result in serious communication overhead.

Therefore, it has become an important technical issue in the technical field to provide a solution in order to solve the aforementioned problems.

SUMMARY OF THE INVENTION

Therefore, it is a primary objective of the present invention to provide a reduced-overhead channel estimation technology for massive MIMO system so as to solve the aforementioned problems.

To achieve the foregoing objective, the present invention provides a reduced-overhead channel estimation method for massive MIMO systems. The method is applied to a base station device, and includes the following steps: first, enabling the base station device to acquire a plurality of first channel matrixes between the base station device and one or a plurality of external user devices. Then, enabling the base station device to label the position of a non-zero coefficient and a common support coefficient in a plurality of fields of the channel matrixes. Afterward, enabling the base station device to configure the non-zero coefficient and the common support coefficient to have the weights different from the weights of the coefficients in the other fields in the channel matrixes so as to provide estimating channel matrixes.

To achieve the foregoing objective, the present invention further provides a reduced-overhead channel estimation system for massive MIMO systems. The system includes a MIMO antenna module and a processing module. The MIMO antenna module communicates with one or a plurality of user devices. The processing module connects to the MIMO antenna module, wherein the processing module acquires a plurality of channel matrixes between the base station device and one or a plurality of external user device, labels the positions of a non-zero coefficient and a common support coefficient in a plurality of fields of the channel matrixes, and configures the non-zero coefficient and the common support coefficient to have the weights different from the weights of the coefficients in other fields in the channel matrixes so as to provide estimating channel matrixes.

To sum up, the reduced-overhead channel estimation method and the system thereof for massive MIMO systems in accordance with the present invention can configure the coefficients of different fields in the channel matrixes to have different weights in order to set the estimating channel matrixes, which can effectively reduce the channel information which needs to be returned.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION OF THE PREFERRED EMBODIMENTS

The following description is about embodiments of the present invention; however it is not intended to limit the scope of the present invention.

Figure 1:
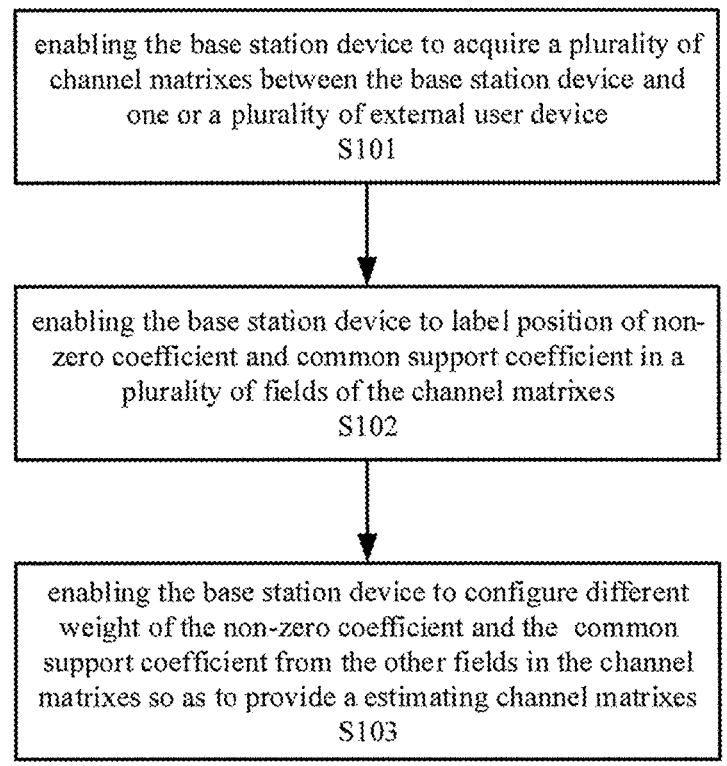
FIG. 1 is the flow chart of the first embodiment of the reduced-overhead channel estimation method for massive MIMO systems in accordance with the present invention.

Please refer to FIG. 1, which is the flow chart of the first embodiment of the reduced-overhead channel estimation method for massive MIMO systems in accordance with the present invention. The method is applied to a base station device, and includes the following steps:

S101: enabling the base station device to acquire a plurality of channel matrixes between the base station device and one or a plurality of external user devices.

S102: enabling the base station device to label the positions of a non-zero coefficient and a common support coefficient in a plurality of fields of the channel matrixes.

S103: enabling the base station device to configure the non-zero coefficient and the common support coefficient to have the weights different from the weights of the coefficients in the other fields in the channel matrixes so as to provide estimating channel matrixes.

In another embodiment, the position of the common support coefficient of the method is the intersection field of the channel matrixes. In another embodiment, the channel matrixes of the method are sparse matrixes. In another embodiment, the channel matrixes of the method include a training symbol matrix that the base station device transmits to the user device, and includes no error loop (NEL) channel matrixes that the user device returns to the base station device. In another embodiment, the estimating channel matrixes of the method are related to the downlink channel, wherein the channel matrixes are angular space channel matrixes.

Figure 2:
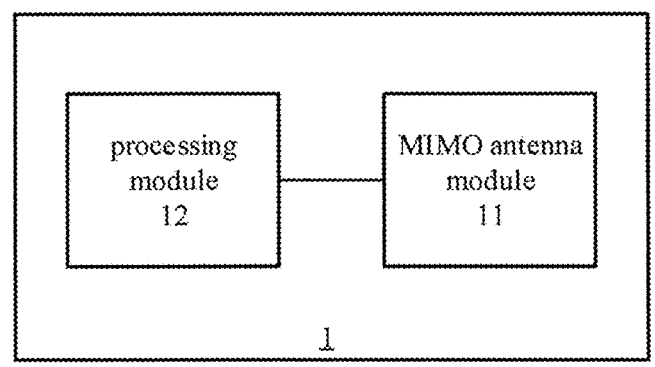
FIG. 2 is the block diagram of the second embodiment of the reduced-overhead channel estimation system for massive MIMO systems in accordance with the present invention.

Please refer to FIG. 2, which is the block diagram of the second embodiment of the reduced-overhead channel estimation system 1 for massive MIMO systems in accordance with the present invention. The system 1 includes a MIMO antenna module 11 and a processing module 12. The MIMO antenna module 11 communicates with one or a plurality of user devices. The processing module 12 connects to the MIMO antenna module 11, wherein the processing module 12 acquires a plurality of channel matrixes between the base station device and one or a plurality of external user device, labels the positions of a non-zero coefficient and a common support coefficient in a plurality of fields of the channel matrixes, and configures the non-zero coefficient and the common support coefficient to have the weights different from the weights of the coefficients in other fields in the channel matrixes so as to provide estimating channel matrixes.

In another embodiment, the position of the common support coefficient of the system 1 is the intersection field of the channel matrixes. In another embodiment, the channel matrixes of the system 1 are sparse matrixes. In another embodiment, the channel matrixes of the system 1 include a training symbol matrix that the base station device transmits to the user device, and includes no error loop (NEL) channel matrixes that the user device returns to the base station device. In another embodiment, the estimating channel matrixes of the system 1 are related to the downlink channel, wherein the channel matrixes are angular space channel matrixes.

The following content will describe the first embodiment of the reduced-overhead channel estimation method in accordance with the present invention. The method is mainly applied to a FDD multi-user massive MIMO system; the reduced-overhead channel estimation method is developed according to the sparsity of the channel status caused by the height difference between the base station device and the user devices.

Consider a multi-user FDD massive MIMO system, which includes a base station device with M antennas and K user devices; each user device uses N antennas to receive signals (N<<M). For the purpose of estimating the downlink channel, the base station device will transmit T training symbols from each of its antennas; under the assumption of flat fading, the signal received by the $i^{th}$ user device during the training stage can be expressed by the following equation:

$$Y_i = H_i X + N_i, 1 \leq i \leq K \quad (1)$$

In the equation, $H_i \in C^{N \times M}$ stands for the $i^{th}$ downlink channel matrix; $H \in C^{M \times T}$ stands for the training symbol matrix, and the total power is $Tr(X^H X) = PT$, where P stands for the energy transmitted by each training during one unit time; $N_i \in C^{N \times T}$ is the noise matrix, where each element is the variance $\sigma_n^2$ and the zero-mean additive white Gaussian noise, and these elements are independent from one another.

As the base station device uses a large number of antennas, the number of the CSI coefficients is also large, which is in proportion to the size of the antenna array used by the base station device; directly estimating these coefficients will not only significantly increase the computation complexity, but also will result in a great amount of CSI feedback overhead.

Figure 3:
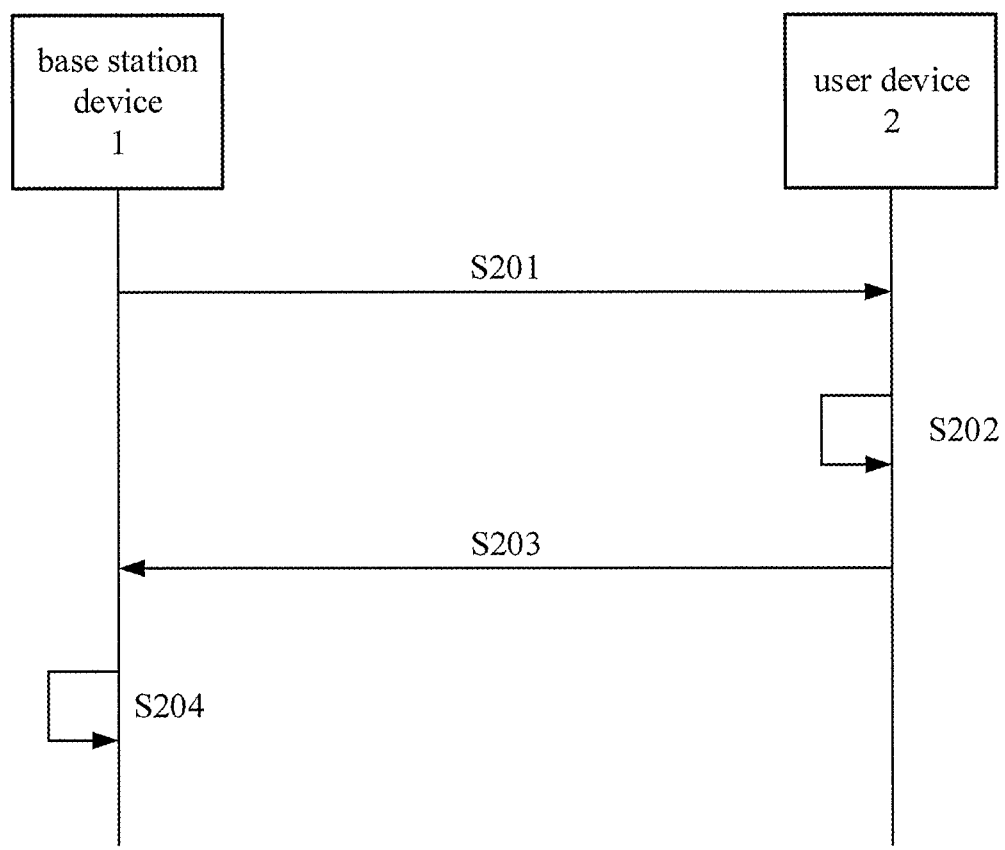
FIG. 3 is the timing diagram of the downlink channel status information acquisition method in accordance with the present invention.

Accordingly, the present invention provides a downlink channel information acquisition method, as shown in FIG. 3. In the method, the base station device broadcasts the training symbol matrix X to all user devices S201; each user device receives the matrix as shown and observed in Equation (1) S202, and then returns a no error loop feedback channel to the base station device S203. The present invention assumes that teach user device transmits the signal to the base station device via a collision-free protocol, such as time division multiple access (TDMA); therefore, the base station device can receive the signal transmitted from each of the user devices and deal with the data $Y_i$ so as to estimate the downlink channel corresponding to each of the user devices S204.

The present invention defines $g_l$, $D_l$, $\theta_l$ and $\phi_l$ as the attenuation of the $i^{th}$ path, the distance between the transmitter and the receiver, the emergent angle and the incident angle respectively; $\lambda_c$ stands for the wavelength of the carrier eave; $L_t$ and $L_r$ are normalized antenna array lengths of the transmitter and the receiver respectively; $d_t$ and $d_r$ are the antenna spacing intervals of the transmitter and the receiver respectively. Assume the used downlink channel has L paths, and the downlink channel matrix $H_i$ of Equation (1) can be expressed by the following equation:

$$H_i = \sum_{l=1}^{L} g_l^b a_r(\cos\phi_l) a_t^H(\cos\theta_l) \quad (2)$$

In the equation, $g_l^b$, $a_r(\cos \phi_l)$ and $a_t(\cos \theta_l)$ are the effective attenuation for the $l^{th}$ path, the array heading vector in the direction of the incident angle $\phi_l$ for the receiver and the array heading vector in the direction of the emergent angle $\theta_l$ for the transmitter, which can be expressed by the following equations:

$$g_l^b = g_l \sqrt{MN} \exp(-j2\pi d_l / \lambda_c) \quad (3)$$

$$a_r(\cos\phi_l) = \quad (4)$$
$$\frac{1}{\sqrt{N}} \left[ 1 \ \exp\left(-j2\pi \frac{d_r}{\lambda_c}\cos\phi_l\right) L \ \exp\left(-j2\pi(N-1)\frac{d_r}{\lambda_c}\cos\phi_l\right) \right]^T,$$

$$a_t(\cos\theta_l) =$$
$$\frac{1}{\sqrt{M}} \left[ 1 \ \exp\left(-j2\pi \frac{d_t}{\lambda_c}\cos\theta_l\right) L \ \exp\left(-j2\pi(M-1)\frac{d_t}{\lambda_c}\cos\theta_l\right) \right]^T.$$

The signal subspaces of the transmitter and the receiver can be generated by the following normalized orthogonal bases respectively:

$$S_r = \{a_r(0), \ldots, a_r((N-1)/L_r)\},$$

$$S_t = \{a_t(0), \ldots, a_t((N-1)/L_t)\}, \quad (5)$$

These bases include the array heading vectors of Equation (4); thus, both the training symbol matrix X and the received signal $Y_i$ can be expressed by the following equations:

$$X = A_T X^a$$

$$Y_i = A_R Y_i^a \quad (6)$$

In the equations, $A_R$ and $A_T$ stands for the normalized matrixes formed by the vectors respectively from the $S_r$ basis and $S_t$ basis. According to Equation (6), which can be expressed by the following equation:

$$Y_i^a = A_R^H H_i A_T X^a + A_R^H N_i \qquad (7)$$

$$= H_i^a X^a + N_i^a$$

In the equation, $N_i^a$ is the expression of the noise matrix $N_i$ of the angle space; $H_i^a$ is the expression of the channel matrix $H_i$ of the angle space, which can be reduced as the following equation:

$$H_i^a = A_R^H H_i A_T. \qquad (8)$$

According to Equation (2), the (n,m)th element of $H_i^a$ can be expressed by the following equation:

$$h_{nm}^a = a_r^H((n-1)/L_r)H_i a_t((m-1)/L_t) \qquad (9)$$

$$= \sum_{l=1}^{L} g_l^b [a_r^H((n-1)/L_r)a_r(\cos\phi_l)][a_t^H(\cos\theta_l)a_t((m-1)/L_t)]$$

Please note that $h_{nm}^a$ is not zero, and if and only if $|(n-1)/L_r - \cos\phi_l| < 1/L_r$ and $|(m-1)/L_t - \cos\theta_l| < 1/L_t$.

Since the base station device uses a lot of transmitting antennas and the scattering is limited; $H_i^a$ is a sparse matrix. The following content lists some basic assumptions and the descriptions of their principles:

1. The column vectors of $H_i^a$ have the same non-zero position, which is marked by $T_i$. The reason of which is that the height of the user devices is usually low, so will result in a lot of scattering.
2. All channel matrixes share the same non-zero position $T_c \triangleq \cap_{1 \le i \le K} T_i$, which is not empty. The reason of which is that the height of the base station device is usually high, so the scattering is limited.
3. Regarding the above two assumed sparsity indicators $|T_c|$ and $|T_i|$, there is a statistic limit $\{s_c, s_1, L, s_K\}$, which results in $|T_c| \ge s_c$ and $|T_i| \le s_i$, $1 \le i \le K$. In addition, the limit can be estimated by some pre-measurement processes, so can be obtained by the base station device.

Figures 4, 5:
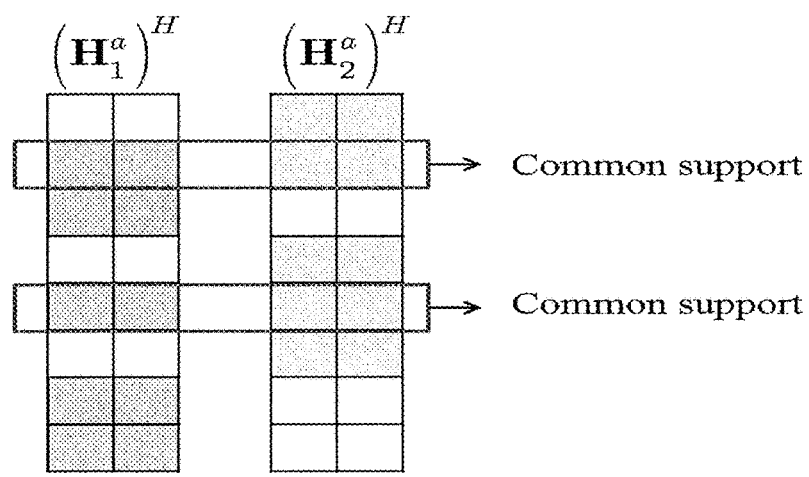
FIG. 4 and FIG. 5 are the schematic views of the channel matrixes in accordance with the present invention.

FIG. 4 is the schematic view of $H_i^a$ according to the above assumptions. When the quantity of the antennas of the base station device increases, $H_i^a$ will be sparser because being limited by the environment. In this kind of environment, the compressive sensing approach will be an important technology for the estimation of the channel matrixes.

The present invention expresses Equation (1) as:

$$\overline{Y}_i = \overline{X} \overline{H}_i + \overline{N}_i, \quad 1 \le i \le K, \text{ where,} \qquad (10)$$

$$\overline{H}_i = (H_i^a)^H, \ \overline{Y}_i = \sqrt{\frac{M}{PT}} Y_i^H A_R, \qquad (11)$$

$$\overline{X} = \sqrt{\frac{M}{PT}} X^H A_T, \ \overline{N}_i = \sqrt{\frac{M}{PT}} N_i^H A_R.$$

Conjugately transposing and vectoring the matrixes at two sides of the equality sign of Equation (10) can obtain the following equation:

$$y_i = Yh_i + n_i, 1 \le i \le K, \qquad (12)$$

In the above equation, $y_i \in \text{vec}(\overline{Y}_i^H)$ and $n_i \in \text{vec}(\overline{N}_i^H)$.

$$h_i \triangleq \text{vec}(\overline{H}_i^H) \in C^{MN} \qquad (13)$$

The above equation stands for the unknown channel vector in the angle space, and:

$$\Psi = (\overline{X} \otimes I_N) \in C^{TN \times MN} \qquad (14)$$

Figure 6:
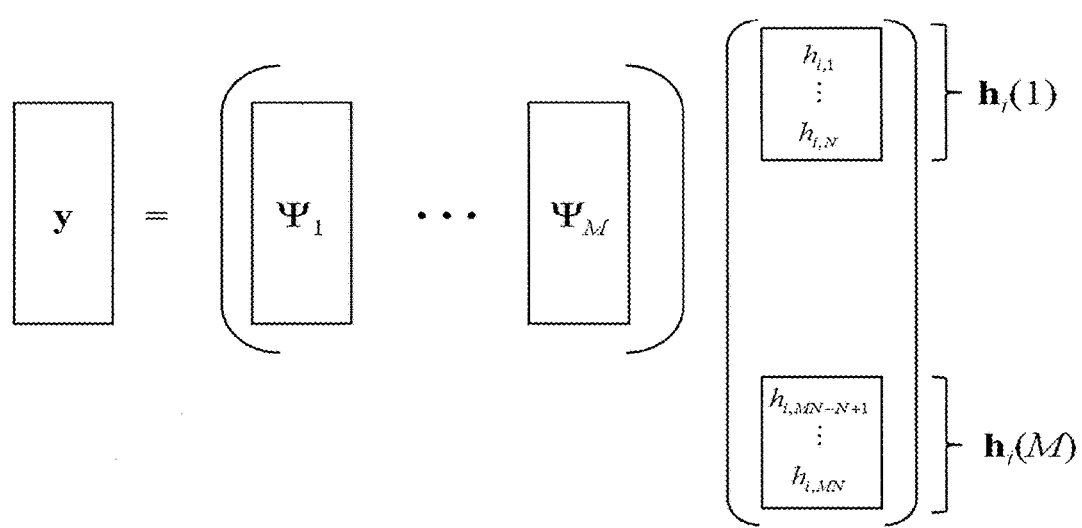
FIG. 6 is the schematic view of the matrix formula for receiving signals in accordance with the present invention.

The above equation stands for the effective training symbol matrix, where vec(.) and $\otimes$ stand for the vectored function and Kronecker product respectively. Here, Equation (12) already transformed the equivalent received signal into the mode which can be dealt with by the conventional compressive sensing approach; the only difference is that $h_i$ is block sparse; in other words, its non-zero position is of block-type expression. Regarding the block sparse characteristic of Equation (12), its schematic view is as shown in FIG. 6 (this is a noise-free version). Here, $\Phi$ is set as a unit matrix, so $\Theta$ is equal to $\Psi$.

As the equivalent received signal of Equation (12) has the block sparse characteristic, the performance of channel estimation can be significantly increased by using the compressive sensing approach according to the aforementioned assumption conditions for the non-zero positions of the channel model. Accordingly, the present invention proposes a two-stage weight-based $l_1$ minimization algorithm to recover the signals of the compressive sensing approach; the algorithm can not only take advantage of the block sparse characteristic, but also can use the $l_1$ minimization algorithm to substitute the OMP-based algorithm in order to achieve higher precision.

The present invention defines the weight-based block noun of the vector $z = [z^T(1) \ldots z^T(M)]^T \in C^{MN}$ by the following equation:

$$\|z\|_{1,w,B} = \sum_{j=1}^{M} w_j \|z(j)\|_2, \qquad (15)$$

Figure 7:
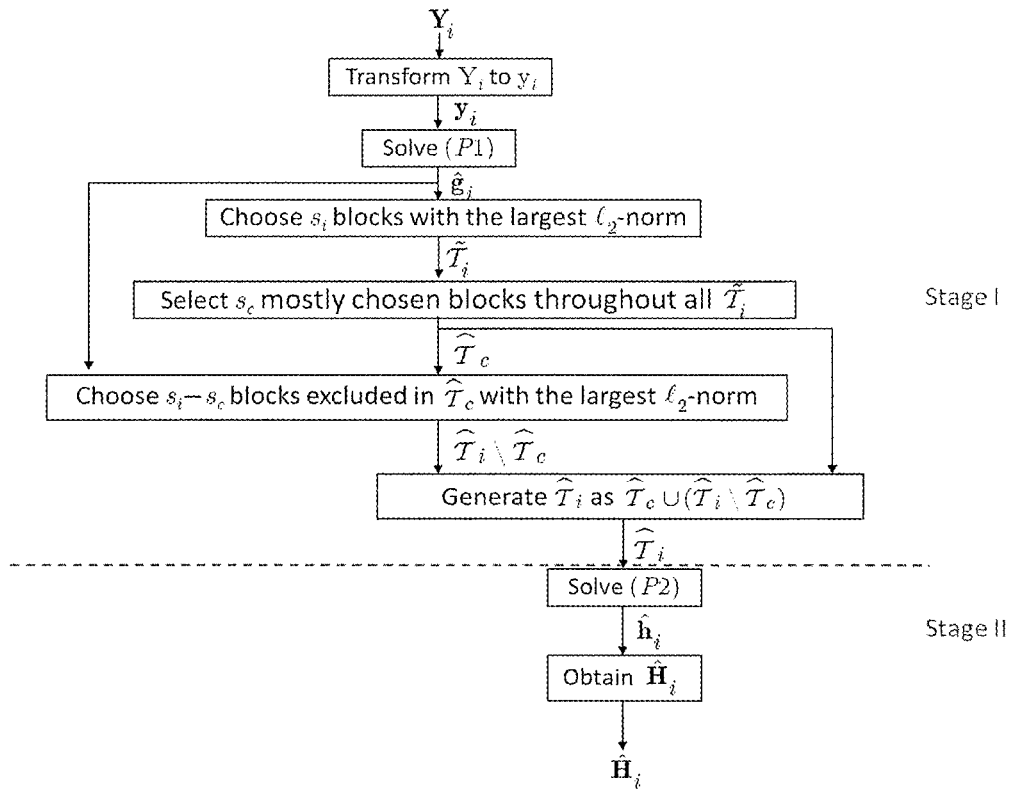
FIG. 7 is the flow chart of one embodiment in accordance with the present invention.

In the equation, $z(j) \in C^N$ stands for the sub-vector of the $j^{th}$ block, and $w_j \in [0,1]$ is the weight corresponding to the sub-vector. According to Equation (15), the flow chart of the method proposed by the present invention is as shown in FIG. 7, and the detailed content of the method is as follows:

Input: receive the pilot symbol signal matrix $Y_i$, where $1 \le i \le K$; the pilot symbol matrix X; the statistic upper sparsity limit $\{s_c, s_1, L, s_K\}$; the weight parameter $0 \le w_c \le w \le 1$.

Output: the estimated channel matrix $\hat{H}_i$, where $1 \le i \le K$.

Stage 1 (define the common and individual non-zero positions of the channel vector)

1. Under $1 \le i \le K$, calculate the optimization question of the minimization of the following $l_1$ without weight; in other words, all weights are defined to be $w_j = 1$, and its solution is expressed by $\hat{g}_i \in C^{MN}$.

$$(P1) \underset{w_j = 1, 1 \le j \le M}{\text{minimize}} \|z_i\|_{1,w,B}, \text{ s.t. } \|y_i - \Psi z_i\|_2 \le \varepsilon$$

2. Record the directory of the block sub-vectors, in the vectors $\hat{g}_i$, with the top $s_i$ largest $l_2$ norms, and then express the set formed by the directory as $\hat{T}_i$; the set has the cardinality $|\hat{T}_i| = s_i$.
3. Regarding all directory sets $\tilde{T}_i$, where $1 \le i \le K$, search the top $s_c$ block directories most frequently selected by the directory sets $\tilde{T}_i$, and then express which as $\hat{T}_c$. It is the estimated value of the common non-zero position $T_c$.
4. For the directories in all directory sets $\tilde{T}_i$, respectively search the directories by excluding the common directory set $\hat{T}_c$, and then express the set formed by the directories as $\hat{T}_i$. The set has the cardinality $|\hat{T}_i| = s_i - s_c$, and has no any intersection with the common directory set $\hat{T}_c$.

5. Express $\hat{T}_i$ as $\hat{T}_i = T_i \cup \hat{T}_c$, which is the estimated value of the individual non-zero position $T_i$.

Stage 2 (estimate the channel matrixes):

1. Under $1 \leq i \leq K$, calculate the optimization question of the minimization of the following weight-based block $l_1$, and the express its solution $\hat{h}_i \in C^{MN}$ as the estimated value of the channel vector under the angle space.

$$(P2) \underset{\substack{w_j = w_c, j \in \hat{T}_c \\ w_j = w, j \in \hat{T}_i \backslash \hat{T}_c \\ w_j = 1, j \notin \hat{T}_i}}{\text{minimize}} \|z_i\|_{1,w,B}, \text{ s.t. } \|y_i - \Psi z_i\|_2 \leq \varepsilon$$

2. Use Equation (11) and Equation (13) to transform $\hat{h}_i$ into the channel matrix estimation value $\hat{H}_i^a$ under the angle space; then, the original channel estimation value $\hat{H}_i$ can be calculated by the equation $\hat{H}_i = A_R \hat{H}_i^a A_T^H$.

Figure 8:
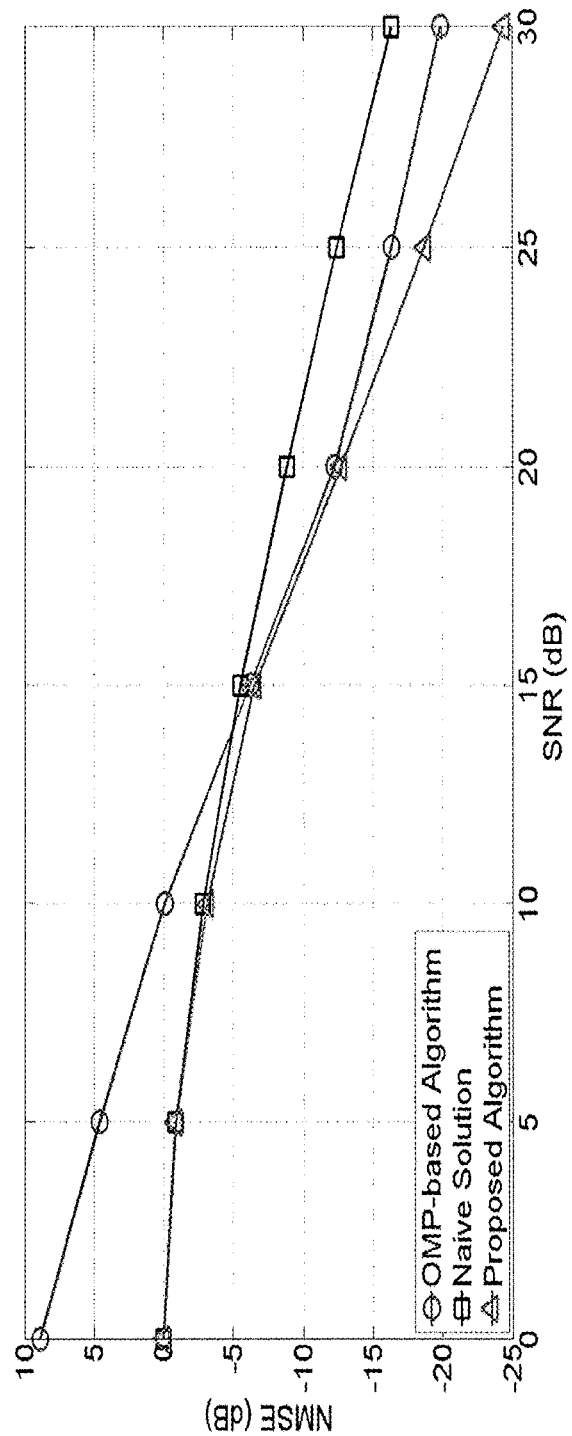
FIG. 8 is the schematic view of the simulation result of one embodiment in accordance with the present invention.

The preferred embodiment of the method according to the present invention is as follows: consider a multi-user FDD massive MIMO system, which includes a base station device with M antennas and K user devices; each user device uses N antennas to receive signals (N<<M). For the purpose of estimating the downlink channel, the base station device will transmit T training symbols from each of its antennas; the base station device broadcasts the training symbol matrix X to all user devices S201 with T symbol durations; each user device returns the received matrix to the base station device via a no error loop feedback channel; then, the base station uses the two-stage weight-based $l_1$ minimization algorithm to recover the signals of the compressive sensing approach in order to estimate the downlink channel information. The detailed settings of the parameters and the weight values are as shown in Table 1 and Table 2. FIG. 8 shows the simulation result of the normalized mean square error (NMSR) under different SNRs, where the red line is the algorithm proposed by the present invention, the black line is the algorithm without weight, and the blue line is the conventional OMP-based algorithm. As shown in FIG. 8, the algorithm proposed by the present invention can achieve better performance under both high SNR and low SNR.

TABLE 1

| | Parameter | | | | | |
|---|---|---|---|---|---|---|
| | M | N | K | T | $S_i$ | $S_c$ |
| Value | 100 | 2 | 8 | 45 | 15 | 4 |

TABLE 2

| | SNR(dB) | | | | | | |
|---|---|---|---|---|---|---|---|
| $(w_c, w)$ | 0 | 5 | 10 | 15 | 20 | 25 | 30 |
| $w_c$ | 1 | 1 | 0.4 | 0 | 0 | 0 | 0 |
| $w$ | 1 | 1 | 0.6 | 0 | 0 | 0 | 0 |

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A reduced-overhead channel estimation method for massive multi-input multi-output (MIMO) systems, applied in a base station device, comprising:
   acquiring at the base station device, a plurality of channel matrixes between the base station device and one or a plurality of user devices;
   labelling at the base station device, positions of a non-zero coefficient and a common support coefficient in a plurality of fields of the plurality of channel matrixes; and
   configuring at the base station device, the non-zero coefficient and the common support coefficient to have weights different from weights of coefficients in other fields in the plurality of channel matrixes so as to provide estimating channel matrixes.

2. The method as claimed in claim 1, wherein the position of the common support coefficient is an intersection field of each of the plurality of channel matrixes.

3. The method as claimed in claim 1, wherein the plurality of channel matrixes are sparse matrixes.

4. The method as claimed in claim 1, wherein the plurality of channel matrixes comprise a training symbol matrix that the base station device transmits to the one or the plurality of user devices, and comprise no error loop (NEL) channel matrixes that the one or the plurality of user devices returns to the base station device.

5. The method as claimed in claim 1, wherein the estimating channel matrixes are related to a plurality of downlink channels between the base station device and the one or the plurality of user devices, wherein the plurality of channel matrixes are angular space channel matrixes.

6. A reduced-overhead channel estimation system for massive multi-input multi-output (MIMO) systems, comprising:
   a MIMO antenna module, communicating with one or a plurality of user devices;
   a processor, connecting to the MIMO antenna module, wherein the processor acquires a plurality of channel matrixes between a base station device and one or a plurality of user devices, labels positions of a non-zero coefficient and a common support coefficient in a plurality of fields of the plurality of channel matrixes, and configures the non-zero coefficient and the common support coefficient to have weights different from weights of coefficients in other fields in the plurality of channel matrixes so as to provide estimating channel matrixes.

7. The system as claimed in claim 6, wherein the position of the common support coefficient is an intersection field of each of the plurality of channel matrixes.

8. The system as claimed in claim 6, wherein the plurality of channel matrixes are sparse matrixes.

9. The system as claimed in claim 6, wherein the plurality of channel matrixes comprise a training symbol matrix that the base station device transmits to the one or the plurality of user devices, and comprise no error loop (NEL) channel matrixes that the one or the plurality of user devices returns to the base station device.

10. The system as claimed in claim 6, wherein the estimating channel matrixes is related to a plurality of downlink channels between the base station device and the one or the plurality of user devices, wherein the plurality of channel matrixes are angular space channel matrixes.

* * * * *